US007415450B2

(12) United States Patent
Gopalan

(10) Patent No.: US 7,415,450 B2
(45) Date of Patent: Aug. 19, 2008

(54) APPARATUS AND METHOD FOR PROVIDING A CENTRALIZED PERSONAL DATA BASE ACCESSED BY COMBINED MULTIPLE IDENTIFICATION NUMBERS

(75) Inventor: Prabhakar Gopalan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1144 days.

(21) Appl. No.: 09/888,452

(22) Filed: Jun. 25, 2001

(65) Prior Publication Data

US 2003/0009435 A1 Jan. 9, 2003

(51) Int. Cl.
*G06F 7/00* (2006.01)
(52) U.S. Cl. .............................. 707/1; 707/10; 707/102
(58) Field of Classification Search ............. 707/1–205; 709/200–207; 702/100–104.1; 202/200–206
See application file for complete search history.

(56) References Cited

U.S. PATENT DOCUMENTS

| 5,742,769 | A | 4/1998 | Lee et al. | 395/200.36 |
| 5,778,367 | A | 7/1998 | Wesinger et al. | 707/10 |
| 5,794,232 | A | 8/1998 | Mahlum et al. | 707/3 |
| 6,208,998 | B1 | 3/2001 | Marcus | 707/104 |

OTHER PUBLICATIONS www.ragnet.ac.uk/policy/privacy.html.*
www.javaworld.com/javaworld/jw-03-1998/jw-03-javadev_p.html.*
http://java.sun.com/developer/TechTips/1998/#017.html.*
http://www-128.ibm.com/developerworks/java/.*
http://209.85.165.104/search?q=cache:8XyeQ66YowUJ:www.churchillobjects.com/c/11009h.html+http://www.churchillobjects.com/c/11009h.html&hl=en&ct=clnk&cd=1&gl=us G o o g l e's cache of http://www.churchillobjects.com/c/11009h.html as retrieved on Feb. 6, 2007.*
Odds & Ends Jan. 2000 vol. 8 Issue 1 The Safety Net Of Passport Your Ticket For Electronically Transporting Your Wallet Online.*
An online fraud-resistant technology for credit card E-transactions Chin-Ming Hsu; Hui-Mei Chao; TENCON 2007—2007 IEEE Region 10 Conference Oct. 30, 2007-Nov. 2, 2007 pp. 1-4.*
On the design of secure electronic payment schemes for Internet Varadharajan, V.; Yi Mu; Computer Security Applications Conference, 1996., 12th Annual Dec. 9-13, 1996 pp. 78-87.*
A security-enhanced one-time payment scheme for credit card Yinjiu Li; Xinwen Zhang; Research Issues on Data Engineering: Web Services for e-Commerce and e-Government Applications, 2004. Proceedings. 14th International Workshop on 2004 pp. 40-47.*
http://www-128.ibm.com/developerworks/java/, year 2007 (copy attached with 892 of Apr. 19, 2007).*
www.ragnet.ac.u k/policy/privacy.html , year 2003 (copy attached with 892 of Jun. 18, 2003.*

* cited by examiner

*Primary Examiner*—David Jung
(74) *Attorney, Agent, or Firm*—David A. Mims; Rudolf O. Siegesmund; Gordon & Rees LLP

(57) ABSTRACT

A centralized personal data base is disclosed that is accessible through the Internet and secured by a combination of identification numbers, including a basic, a primary and a secondary number. The secure personal data base is accessible to the user by the combination of the basic and a primary number. The secure personal data base is accessible to others who have been supplied with a primary and a secondary number.

20 Claims, 4 Drawing Sheets

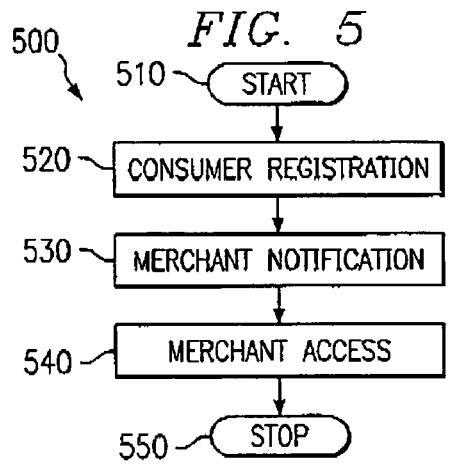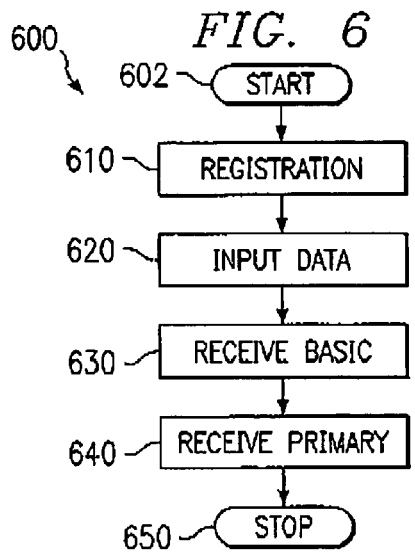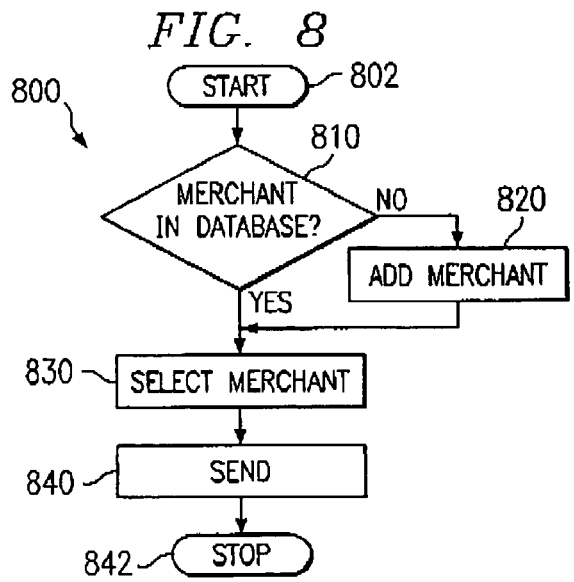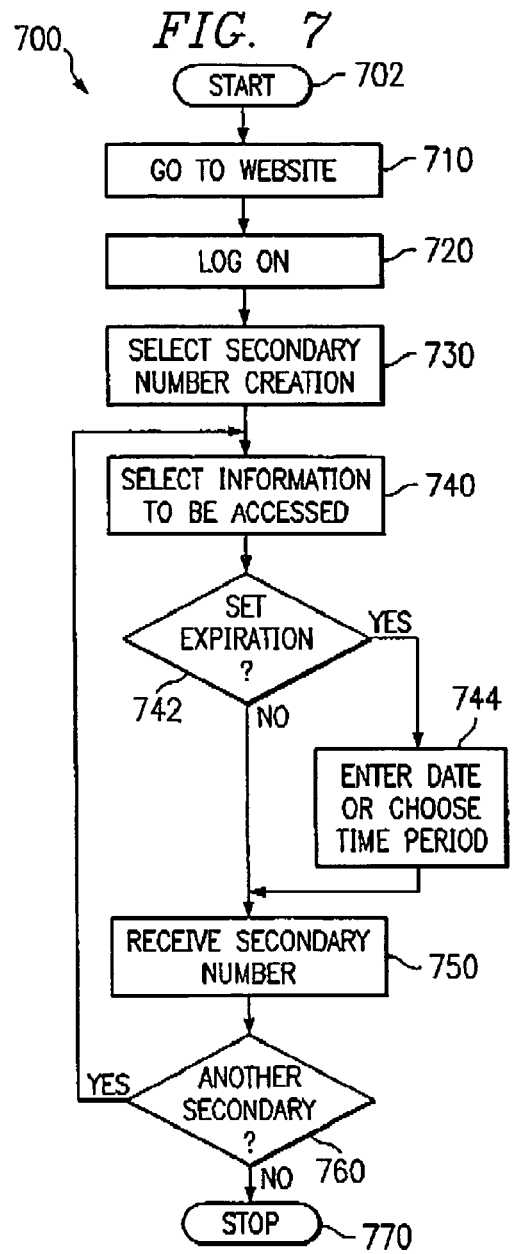

APPARATUS AND METHOD FOR PROVIDING A CENTRALIZED PERSONAL DATA BASE ACCESSED BY COMBINED MULTIPLE IDENTIFICATION NUMBERS

FIELD OF THE INVENTION

The present invention relates to a centralized personal data bank and a system for accessing the centralized personal data bank by a user and also for accessing the centralized personal data bank by any person to whom the user gives a primary number and a secondary number.

BACKGROUND OF THE INVENTION

Personal information such as name, address, telephone number, credit, or account information is needed for most transactions. With the increase in transactions conducted over the Internet, the repetitive requirement for providing personal information increases rapidly. For example, every company that sends a bill or a monthly statement (e.g. telephone company, utility company, bank, etc.) to a person, requires notification of a change in that person's address, phone number or other information. A need exists for an automated process that eliminates the repetitive tasks of providing basic information, updating account records, providing change of address information, and contacting each separate business.

SUMMARY OF THE INVENTION

The invention that meets the needs identified above is a centralized personal data base accessible through the Internet and secured by a combination of identification numbers, including a basic, a primary and a secondary number. The secure personal data base is accessible to the user by the combination of the basic and a primary number. The secure personal data base is accessible to others who have been supplied with a primary and a secondary number.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is flowchart of the overall centralized personal data base process;
FIG. 6 is a flowchart of the registration process;
FIG. 7 is a flow chart of the account set up process;
FIG. 8 is a flow chart of the merchant notification process.

DETAILED DESCRIPTION OF THE PREFERRED EMBODIMENT

Figure 1:
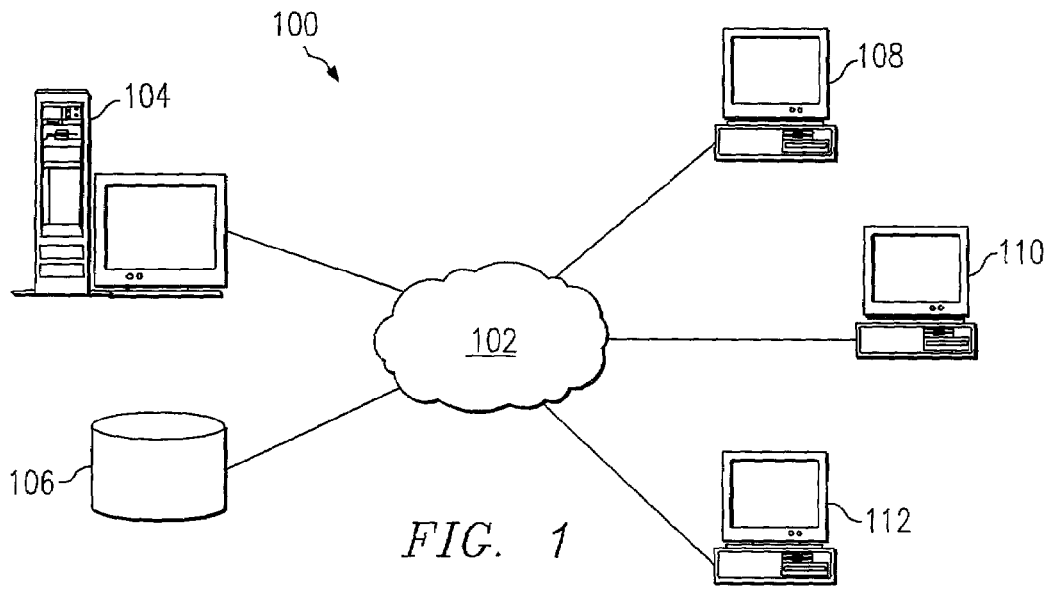
FIG. 1 is depiction of a distributed data processing system.

FIG. 1 depicts a pictorial representation of distributed data processing system 100 in which the present invention may be implemented and is intended as an example, and not as an architectural limitation, for the processes of the present invention. Distributed data processing system 100 is a network of computers containing network 102, which is the medium used to provide communications links between various devices and computers connected together within distributed data processing system 100. Network 102 may include permanent connections, such as wire or fiber optic cables, or temporary connections made through telephone connections. In the depicted example, server 104 is connected to network 102 along with storage unit 106. In addition, clients 108, 110, and 112 also are connected to a network 102. Clients 108, 110, and 112 may be, for example, personal computers or network computers.

For purposes of this application, a network computer is any computer, coupled to a network, which receives a program or other application from another computer coupled to the network. In the depicted example, server 104 provides Web based applications to clients 108, 110 and 112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as for example, an intranet, a local area network (LAN), or a wide area network (WAN).

Figure 2:
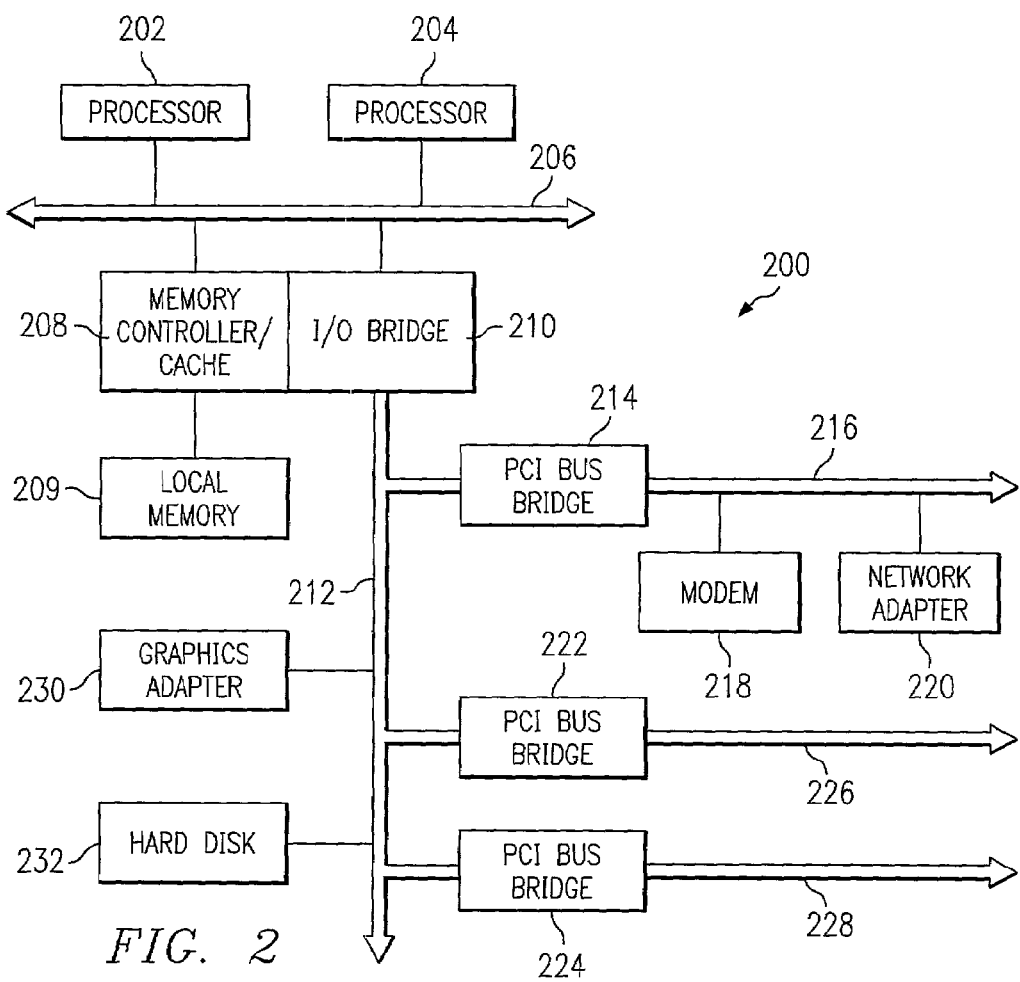
FIG. 2 is a depiction of a server computer.

Referring to FIG. 2, a block diagram depicts a data processing system, which may be implemented as a server, such as server 104 in FIG. 1. Data processing system 200 may be a symmetric multiprocessor (SMP) system including a plurality of processors such as first processor 202 and second processor 204 connected to system bus 206. Alternatively, a single processor system may be employed. Also connected to system bus 206 is memory controller/cache 208, which provides an interface to local memory 209 I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to first PCI local bus 216. Modem 218 may be connected to first PCI bus local 216. Typical PCI bus implementations will support four PCI expansion slots or add-in connectors. Communication links to clients 108, 110 and 112 in FIG. 1 may be provided through modem 218 and network adapter 220 connected to first PCI local bus 216 through add-in boards. Additional PCI bus bridges such as second PCI bus bridge 222 and third PCI bus bridge 224 provide interfaces for additional PCI local buses such as second PCI local bus 226 and third PCI local bus 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly Those of ordinary skill in the art will appreciate that the hardware depicted in FIG. 2 may vary. For example, other peripheral devices, such as an optical disk drive and the like also may be used in addition or in place of the hardware depicted The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
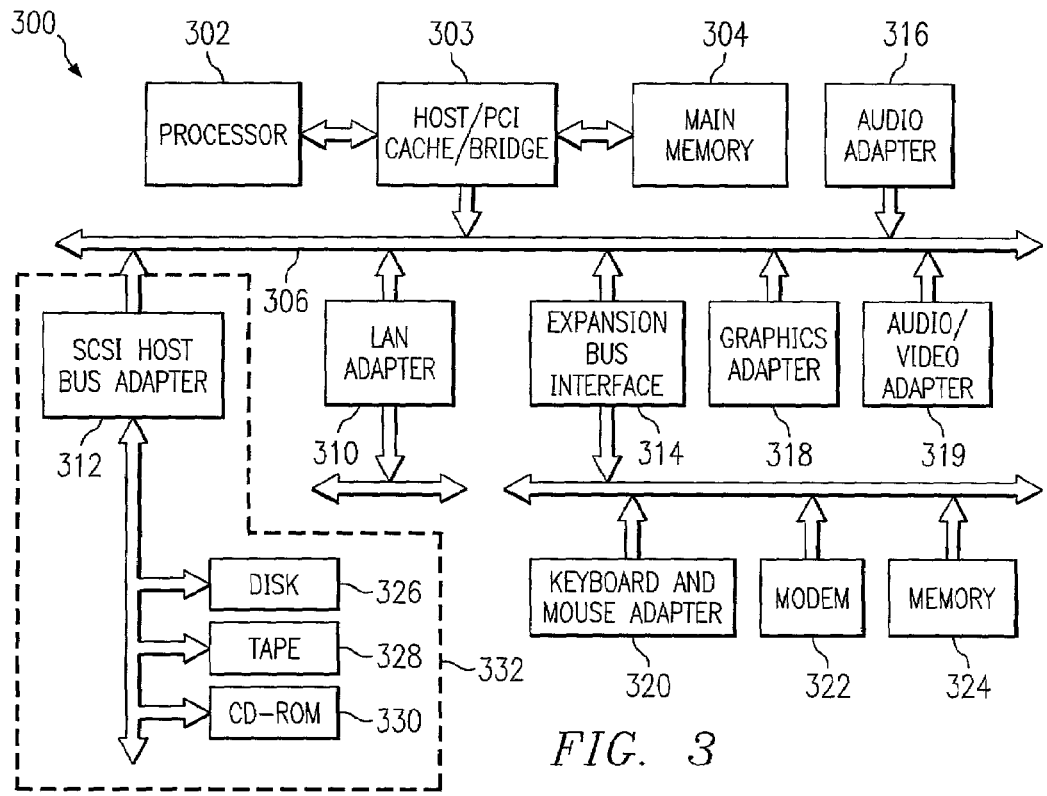
FIG. 3 is a depiction of a client computer.

With reference now to FIG. 3, a block diagram illustrates data processing system 300 in which the invention may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 303. PCI bridge 303 also may include an integrated memory controller and cache memory for Processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system, such as JAVA, may run in conjunction with the operating system and provides calls to the operating system from JAVA programs or applications executing on data processing system 300. "JAVA" is a trademark of Sun Microsystems, Incorporated. Instructions for the operating system, the object-oriented operating system, and applications or programs may be located on storage devices, such as hard disk drive 326, and they may be loaded into main memory 304 for execution by processor 302. Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system. For example, data processing system 300, if optionally configured as a network computer, may not include SCSI host bus adapter 312, hard disk drive 326, tape drive 328, and CD-ROM 330, as noted by the box with the dotted line in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data. The depicted example in FIG. 3 and above-described examples are not meant to imply architectural limitations with respect to the present invention. It is important to note that while the present invention has been described in the context of a fully functioning data processing system, those of ordinary skill in the art will appreciate that the processes of the present invention are capable of being distributed in a form of a computer readable medium of instructions and a variety of forms. The present invention applies equally regardless of the particular type of signal bearing media actually used to carry out the distribution. Examples of computer readable media include recordable-type media, such as a floppy disc, a hard disk drive, a RAM, and a CD-ROM, and transmission-type media such as digital and analog communications links.

Figure 4:
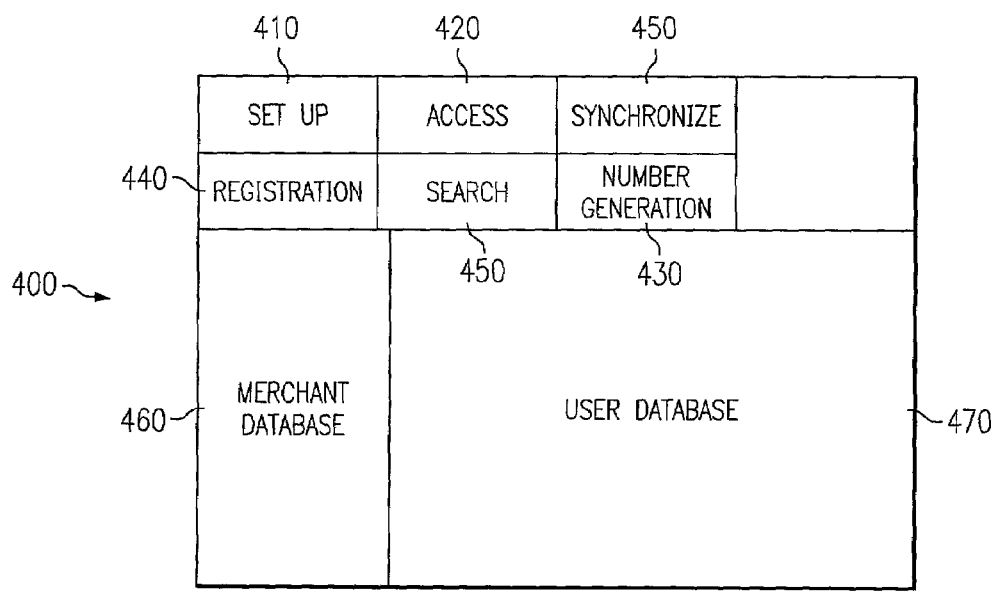
FIG. 4 is a depiction of the centralized personal data base memory.

FIG. 4 depicts centralized personal data base 400. As used herein, the term centralized personal data base (CPDB) means (1) a data base tat may be accessed by a consumer having a basic and a primary number and also by any person to whom the consumer provides a primary and a secondary number, (2) a data base that can be accessed through the Internet from a centralized personal data base web site, and (3) tat may be located in one storage area connected to one or more server computers that may be distributed in multiple storage areas each of which are connected to one or more server computers. CPDB 400 contains set-up program 410, access program 420, basic, primary, and secondary number generation program 430, registration program 440, search program 450, merchant data base 460, and consumer data base 470. Alternatively, set-up program 410, access program 420, primary and secondary number generation program 430, registration program 440, and search program 450 may be located in the memory of a server computer or distributed among a plurality of computers and linked to each other and the CPDB 400 by a network. Furthermore, one or more of the above referenced programs may be built into a web browser program or furnished as a plug-in to a web browser program.

FIG. 5 depicts a flow chart of CPDB process 500 showing the three main steps in the overall CPDB process 500. When CPDB process 500 begins (510), the first step is registration 600 (520). The second step is notification 800 (530). The third step is access 1000 (540). CPDB process 500 then ends (550). FIG. 6 depicts the steps in registration 600. Registration 600 begins (602) when registration program 440 of CPDB 400 is invoked by a consumer accessing the CPDB website and indicating a desire to register (610). The consumer inputs data such as name, social security number, date of birth, phone number, fax number, e-mail address, and any other information that may be required by a merchant, service provider or government agency (620). The consumer receives a basic number (630). The consumer also receives a primary number (640). As used herein the term number means a unique code number comprising a plurality of individual numerals assigned to an authorized consumer or merchant and shall have the same meaning as a personal identification number (PIN). The basic number and the primary number are used by the CPDB customer to access and change the CPDB record and to create or delete primary and secondary numbers. The registration process ends (650).

The relationship of the three types of numbers used for access is shown in Table A.

TABLE A

| Type | User | Merchant |
| --- | --- | --- |
| Basic | Yes | No |
| Primary | Yes | Yes |
| Secondary | No | Yes |

Figure 9:
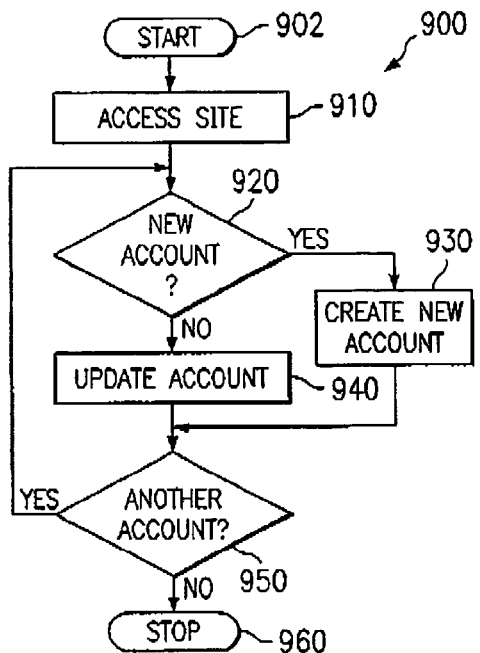
FIG. 9 is a flowchart of the update process.
Figure 10:
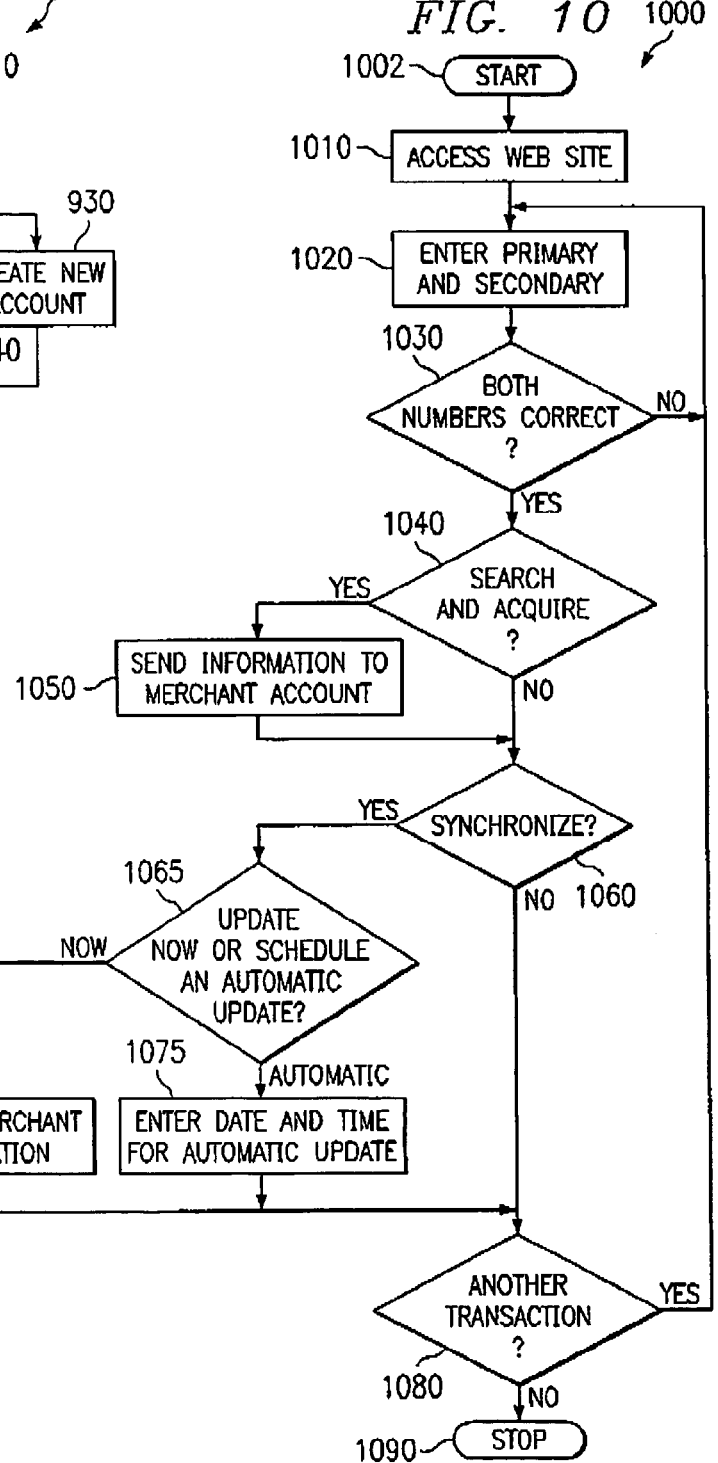
FIG. 10 is a flow chart of the merchant access process.

The user is the only person with the basic number and therefore, although the primary number is given out to others, the user is the only one who can access his account to input or change information. The secondary number is used by the person to whom the user desires to give access. A variety of secondary numbers can be created for different purposes. FIG. 7 depicts the process for secondary number creation 700. The process starts (702) when the consumer goes to the CPDB website (710) and logs on (720) by inputting the basic number and the primary number. The consumer selects secondary number creation from the menu (730). One or more secondary numbers can be created for each CPDB primary number. The consumer selects the information that is to be accessible to a merchant (740). In other words, the consumer decides what information can be accessed by a merchant using the primary number in combination with each particular secondary number the consumer will provide. A determination is made whether the consumer wants to attach an expiration date to the secondary number (742). If the consumer wants to attach an expiration date to the secondary number, the consumer will enter the expiration date or select from a range of time periods offered by the CPDB website (744). If the consumer enters an expiration date or selects a time period, the secondary number will not be effective after the date arrives or the time period expires. If the consumer does not want to place an expiration date on the secondary number, then the process goes to step 750. The consumer receives a secondary number (750). A determination is made as to whether another secondary number is desired (760). If another secondary number is desired, then the process returns to step 740. If another secondary number is not desired, the process ends (770). FIG. 8 depicts a flow chart of merchant notification process 800. Notification process 800 starts (802) and a determination is made as to whether the merchant is in the merchant data base of the CPDB (810). If the merchant is not in the CPDB merchant data base, then the consumer inputs the information (820) and the process goes to step 830. If the merchant is in the CPDB merchant data base, then the process goes to step 830. The consumer selects the merchants to notify (830). For example, the consumer may select merchants, such as the telephone company, utility company, credit card company or bank. Notification may be accomplished by using the primary number and secondary number through the CPDB web site facility (840) or by contacting the companies directly one at a time. In each of these transactions, the consumer may already have an account with the merchant or may desire to have one. The merchant notification process 800 then ends (842). FIG. 9 depicts flow chart of the update procedure 900. The update procedure 900 starts (902) when the consumer accesses the website (910). A determination is made as to whether the consumer requires a new account or has an existing account (920). If the CPDB consumer already has an account, then the primary and secondary number combination will be used for updating and posting changes into consumer's CPDB record (940). If the consumer desires to have a new account, the consumer need only transmit two data fields, i.e. the primary number and a secondary number, to create a new account with the merchant (930). Once the account is created, all required data fields can be extracted from the CPDB by the merchant using the primary number and the secondary number. A determination is then made as to whether there is another account (950). If there is another account, update procedure 900 returns to step 920. If there is not another account, update procedure 900 ends (960). FIG. 10 depicts the merchant access process 1000. Once the merchant has the primary number and the secondary number, the merchant may access the CPDB. Each merchant in the CPDB merchant directory queries the centralized personal data base with the primary number and secondary number to obtain information about the consumer. For example, a merchant may require such information at the time of the monthly billing statements to customers. Also, on a pre-determined date of every month (depending upon the number of records to be updated), the merchant can update his data base with the GPDB in a process called synchronization. As used herein, synchronization means either an automatic or merchant initiated transfer of the latest data to the merchant from the CPDB at a pre-arranged time and pre-arranged schedule. For example, the merchant may synchronize his data base at the time of sending promotional offers, at the time of sending important account information or policy changes, and while signing up new members. Alternatively, the merchant may specify a time and day to automatically update information. The process begins (1002) and the merchant accesses the web site (1010). The merchant enters the primary number and the secondary number (1020). A determination is made as to whether both numbers are correct (1030). If both numbers are not correct the process returns to step 1020. If both numbers are correct, a determination is made whether the merchant wants to search and acquire data (1040). If the merchant wants to search and acquire data, then the search is conducted, the information acquired and the information transmitted to the merchant account (1050). If the merchant does not want to search and acquire data, then the process determines whether the merchant wants to synchronize data (1060). If the merchant wants to synchronize data, then a determination is made whether the merchant wants to initiate an update at the present time or to schedule an automatic update (1065). If the merchant wants to initiate an update at the present time, the merchant information is updated (1070). If the merchant wants to schedule an automatic update, the date and time for the update is entered (1075). If the merchant does not want to synchronize data, then a determination is made as to whether another transaction is desired (1080). If another transaction is desired, the process returns to step 1020. If another transaction is not desired, then the process ends (1090).

The advantages provided by the present invention should be apparent in light of the detailed description provided above. The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed:

1. A programmable apparatus comprising:
   a centralized personal data base in a memory connected to a server computer;
   a computer program in the memory, the computer program adapted to cause the computer to make the centralized personal database accessible by a consumer having a basic number and a primary number and accessible to a merchant having the primary number and a secondary number, the secondary number being associated with a consumer-defined level of access to the centralized personal data base;
   a network;
   a consumer computer and a merchant computer connected to the server computer by the network;

wherein the consumer uses the consumer computer, the server computer, the basic number, and primary number to create an account in the centralized personal data base;

wherein the consumer uses the consumer computer, the server computer, the basic number, and the primary number to access the account in the centralized personal data base and to modify an account data in the account;

wherein the consumer uses the consumer computer and the server computer to create the secondary number and to provide the primary number and the secondary number to the merchant;

wherein the merchant uses the merchant computer, the server computer, the primary number and the secondary number to access the account and the merchant is prohibited from modifying the account data in the account.

2. The programmable apparatus of claim 1 further comprising synchronization of data between the server computer and the merchant computer, said synchronization being a transfer of the account data from the data base to the merchant at a pre-arranged time and a pre-arranged schedule.

3. The programmable apparatus of claim 1 further comprising data transmitted from the server computer to the consumer computer in response to receipt of a basic number and the primary number by the server computer.

4. The programmable apparatus of claim 1 further comprising data transmitted from the server computer to the merchant computer in response to receipt of the primary number and the secondary number by the server computer.

5. The programmable apparatus of claim 1 wherein the data base further comprises a computer implemented process comprising:
consumer registration with the data base;
merchant notification of the consumer registration; and
updating merchant records using information stored in the data base.

6. The programmable apparatus of claim 1 wherein the data base further comprises a merchant access program comprising:
instructions for verifying correct entry of the primary number and the secondary number by the merchant;
instructions for allowing the merchant to search for information in the account; and
instructions for allowing the merchant to synchronize the information in the data base with the merchant's records.

7. The programmable apparatus of claim 6 wherein the merchant access program further comprises: instructions for allowing a merchant to designate whether the synchronization is immediate or scheduled.

8. The programmable apparatus of claim 1 wherein the data base further comprises a secondary number generation program; comprising:
instructions for consumer access to the account using the basic number and the primary number;
instructions for consumer designation of an information to be accessed by the merchant;
instructions for creation of the primary number and the secondary number; and
instructions for transmitting the primary number and the secondary number to the merchant.

9. The programmable apparatus of claim 8 wherein the secondary number generation program further comprises: instructions for consumer designation of an expiration date for the secondary number.

10. The programmable apparatus of claim 1 wherein the data base is accessed through the Internet through a centralized personal data base web site; and wherein the data base is located in a storage area connected to one or more server computers that may be distributed in multiple storage areas each of which are connected to one or more server computers.

11. The programmable apparatus of claim 1 wherein the data base further comprises a registration program comprising:
instructions for allowing the consumer to register the account with the data base;
instructions for accepting consumer input of data into the account; and
instructions for issuing the basic number and the primary number to the consumer.

12. The programmable apparatus of claim 1 wherein the data base further comprises a merchant notification program comprising:
instructions for determining whether the merchant has been added to the data base;
responsive to a determination that the merchant has not been added to the data base, instructions for adding a merchant to the data base;
instructions for associating a merchant with data in the account, a primary number, and a secondary number; and
instructions for sending the primary number and the secondary number to the merchant.

13. The programmable apparatus of claim 1 wherein the data base further comprises a merchant data base.

14. The programmable apparatus of claim 1 wherein the data base further comprises a consumer data base.

15. The programmable apparatus of claim 1 wherein the data base may be accessed by the consumer using the basic number and the primary number; and wherein the consumer is the only party who may modify the data in the data base.

16. The programmable apparatus of claim 1 wherein the data base may be accessed by the merchant using the primary number and the secondary number; and wherein the secondary number is unique to the merchant and distinguishes the merchant from a plurality other merchants.

17. A method for remotely providing personal information from a centralized personal data base comprising the steps of:
using a centralized personal data base website,
registering with the centralized personal data base;
creating an account for a consumer at the centralized personal data base using a basic number and a primary number;
creating a secondary number associated with a consumer-defined level of access to the centralized personal data base;
providing a person with the primary number and the secondary number;
wherein the primary number and the secondary number allow the person to access the account;
wherein the primary number and the secondary number prohibit the person from modifying the account and
wherein the primary number and secondary number are specific to each individual person to whom the primary number and the secondary number are provided.

18. The method of claim 17 further comprising a step of selecting information to be accessed by a combination of the secondary number and the primary number.

19. The method of claim 17 further comprising a step of synchronization.

20. A computer readable memory comprising:
a computer readable storage medium;
a data base in said computer readable memory;
a computer program stored in said storage medium containing instructions to cause the computer to:

create a centralized personal data base in a first computer, the centralized personal database being accessible by a consumer having a basic number and a primary number and accessible to a merchant having the primary number and a secondary number, the secondary number being associated with a consumer-defined level of access to the centralized personal data base;

connect a second computer to the first computer by a network;

responsive to a first user input of the basic number and the primary number, create an account in the centralized personal data base;

responsive to a second user input of the basic number and the primary number, access the account in the centralized personal data base and permit the first user to modify an account data in the account;

responsive to a third user input of the basic number and the primary number, create the secondary number and provide the primary number and the secondary number to a merchant; and responsive to a merchant input of the primary number and the secondary number, providing the merchant with access to the account and preventing the merchant from modifying the account data in the account.

* * * * *